US007840405B1

(12) United States Patent
Lee et al.

(10) Patent No.: US 7,840,405 B1
(45) Date of Patent: Nov. 23, 2010

(54) GENERATION OF SPEECH RECOGNITION GRAMMARS FOR CONDUCTING SEARCHES

(75) Inventors: Nicholas J. Lee, Seattle, WA (US); Robert Frederick, Seattle, WA (US); Ronald J. Schoenbaum, Newport Coast, CA (US)

(73) Assignee: A9.com, Inc., Palo Alto, CA (US)

( * ) Notice: Subject to any disclaimer, the term of this patent is extended or adjusted under 35 U.S.C. 154(b) by 503 days.

(21) Appl. No.: 12/048,091

(22) Filed: Mar. 13, 2008

Related U.S. Application Data

(62) Division of application No. 10/392,203, filed on Mar. 18, 2003, now Pat. No. 7,729,913.

(51) Int. Cl.
G10L 15/06 (2006.01)
G10L 15/00 (2006.01)
(52) U.S. Cl. ...................... 704/243; 704/231
(58) Field of Classification Search ............. None
See application file for complete search history.

(56) References Cited

U.S. PATENT DOCUMENTS

| | | | |
|---|---|---|---|
| 5,027,406 A | 6/1991 | Roberts et al. | |
| 5,337,347 A | 8/1994 | Halstead-Nussloch et al. | |
| 5,452,397 A | 9/1995 | Ittycheriah et al. | |
| 5,500,920 A | 3/1996 | Kupiec | |
| 5,758,322 A | 5/1998 | Rongley | |
| 5,774,628 A | 6/1998 | Hemphill | |
| 5,832,428 A | 11/1998 | Chow et al. | |
| 5,917,889 A | 6/1999 | Brotman et al. | |
| 5,917,944 A | 6/1999 | Wakisaka et al. | |
| 5,995,928 A | 11/1999 | Nguyen et al. | |
| 6,014,624 A | 1/2000 | Raman | |
| 6,061,654 A | 5/2000 | Brown et al. | |
| 6,073,100 A | 6/2000 | Goodridge, Jr. | |
| 6,137,863 A | 10/2000 | Brown et al. | |
| 6,144,938 A | 11/2000 | Surace et al. | |
| 6,148,105 A | 11/2000 | Wakisaka et al. | |
| 6,188,985 B1 | 2/2001 | Thrift et al. | |
| 6,223,059 B1 | 4/2001 | Haestrup | |
| 6,282,512 B1 | 8/2001 | Hemphill | |
| 6,307,549 B1 | 10/2001 | King et al. | |
| 6,308,157 B1 | 10/2001 | Vanbuskirk et al. | |
| 6,311,182 B1 | 10/2001 | Colbath et al. | |
| 6,324,513 B1 | 11/2001 | Nagai et al. | |
| 6,334,103 B1 | 12/2001 | Surace et al. | |
| 6,377,927 B1 | 4/2002 | Loghmani et al. | |
| 6,392,640 B1 | 5/2002 | Will | |
| 6,434,524 B1 | 8/2002 | Weber | |
| 6,456,974 B1 | 9/2002 | Baker et al. | |
| 6,484,136 B1 * | 11/2002 | Kanevsky et al. | .............. 704/9 |
| 6,532,444 B1 | 3/2003 | Weber | |
| 6,728,348 B2 | 4/2004 | Denenberg et al. | |
| 6,772,150 B1 | 8/2004 | Whitman et al. | |
| 6,839,669 B1 | 1/2005 | Gould et al. | |
| 6,925,154 B2 | 8/2005 | Gao et al. | |
| 7,007,239 B1 | 2/2006 | Hawkins et al. | |
| 7,050,977 B1 | 5/2006 | Bennett | |
| 7,136,854 B2 | 11/2006 | Smith et al. | |
| 7,567,902 B2 * | 7/2009 | Davis et al. | .................. 704/251 |
| 2001/0034603 A1 | 10/2001 | Thrift et al. | |
| 2002/0069059 A1 * | 6/2002 | Smith | .......................... 704/257 |
| 2003/0041030 A1 | 2/2003 | Mansfield | |
| 2004/0073540 A1 | 4/2004 | Wang et al. | |
| 2004/0122670 A1 | 6/2004 | Nuessle et al. | |

FOREIGN PATENT DOCUMENTS

| | | |
|---|---|---|
| WO | WO 99/66427 | 12/1999 |
| WO | WO 00/14729 | 3/2000 |
| WO | WO 01/80079 A2 | 10/2001 |
| WO | WO 02/05263 A1 | 1/2002 |

OTHER PUBLICATIONS

U. Glavitsch and P. Schauble, "A System for retrieving speech documents," Proceedings of the Fifteenth Annual International ACM SIGIR conference on Research and development in information retrieval, pp. 168-176, dated Jun. 21-21, 1992.

Co-pending U.S. Appl. No. 09/650,173, filed Aug. 29, 2000.

Davis, J., "Let Your Fingers Do the Spelling: Disambiguating Words Spelled with the Telephone Keypad," Journal of the American Voice I/O Society 9 (AVIOSJ), Mar. 1991, pp. 57-66.

Marx, M., et. al., "Reliable Spelling Despite Unreliable Letter Recognition," Proceedings of the 1994 Conference of the American Voice I/O Society (AVIOS), San Jose, California, Sep. 1994.

Marx, M., et. al., "Putting people first: specifying proper names in speech interfaces," Proceedings of the ACM symposium on User interface software and technology (UIST), 1994, pp. 29-37.

* cited by examiner

*Primary Examiner*—David R Hudspeth
*Assistant Examiner*—Samuel G Neway
(74) *Attorney, Agent, or Firm*—Knobbe, Martens, Olson & Bear LLP

(57) ABSTRACT

Various processes are disclosed for conducting database searches by voice. One such process enables a user to efficiently submit a search query by partially spelling the search query (either on a telephone keypad or via voice utterances) and uttering the full search query. Also disclosed are various processes for generating speech recognition grammars for interpreting utterances of search queries. In one such process, search queries are selected from a search query log for incorporation into a speech recognition grammar. The search query log may include or consist of search queries specified by users without the use of voice.

19 Claims, 9 Drawing Sheets

GENERATION OF SPEECH RECOGNITION GRAMMARS FOR CONDUCTING SEARCHES

RELATED APPLICATIONS

This application is a division of U.S. application Ser. No. 10/392,203, filed Mar. 18, 2003. The present application bodily incorporates the disclosure of, but does not claim priority to, U.S. application Ser. No. 09/650,173, filed Aug. 29, 2000.

FIELD OF THE INVENTION

The present invention relates to speech recognition systems, and to the generation of speech recognition grammars suitable for use in conducting database searches.

BACKGROUND OF THE INVENTION

With the increasing popularity of wireless devices, many web site operators and other content providers are deploying voice driven interfaces ("voice interfaces") for allowing users to browse their content. The voice interfaces commonly include "grammars" that define the valid utterances (words, phrases, etc.) that can occur at a given state within a browsing session. The grammars are fed to a speech recognition system and are used to interpret the user's voice entry. In web-based systems, the grammars are typically embedded as text files within voiceXML versions of web pages.

One problem with speech recognition systems is that the reliability of the recognition process tends to be inversely proportional to the size of the grammar. This poses a significant problem to content providers wishing to place large databases of products or other items online in a voice-searchable form. Specifically, if all or even a significant portion of the terms in the searchable domain are incorporated into the grammar, the grammar may become too large to provide reliable speech recognition. If, on the other hand, many terms are omitted from the grammar, the system will be incapable of recognizing many valid queries. The present disclosure seeks to address this and other problems.

SUMMARY OF THE DISCLOSURE

Various computerized methods are disclosed for improving the reliability with which a user's utterance of a search query is recognized. The methods may be used in the context of a system for browsing and conducting database searches by telephone. Also disclosed are various methods for generating speech recognition grammars, and for selecting speech recognition grammars for use.

In accordance with one inventive feature, speech recognition grammars are generated by selecting search queries (terms and/or phrases) from a query log reflective of searches executed by many different users. The search queries may be selected for inclusion in a grammar or grammar set based on a variety of criteria, such as frequency of use, whether the search query produced a NULL search result, and/or whether the query led to a positive reaction by the user (e.g., selection of a search result item for viewing). In one embodiment, this grammar generation process is used within a system that supports both ordinary web browsing and browsing by telephone, and the search queries incorporated into the speech recognition grammars include search queries submitted textually via ordinary web browsers.

In accordance with another feature, a user is initially prompted to supply a set or string of characters from the search query, such as one or more letters of a query term. The type of the query term may be dependent upon the context of the search. For example, if the user is conducting an author search for books, the user may be prompted to enter the first few letters of the author's first or last name. The characters may, for example, be entered by voice, a telephone keypad, a fully functional keyboard, or a combination thereof. The user is also prompted to utter (say) the complete search query. To process the utterance of the search query, a grammar is dynamically generated (or alternatively read from memory) according to the set of characters supplied by the user. This grammar is preferably derived from the subset of database items corresponding to the entered characters. For example, if the user enters the first three letters of an author's name, the grammar may be derived from all items having authors whose names start with these characters. Because the grammar is derived from the matching items, as opposed to all items within the particular domain being searched, the grammar is smaller in size and produces a significantly more reliable speech recognition result. In one embodiment, a grammar is generated each time a user searches for an item. In another embodiment, once a grammar is generated, the grammar is saved in memory for some defined length of time for use with subsequent search query submissions. In accordance with another feature, separate speech recognition grammars are generated for each of multiple combinations of N telephone digits (e.g., 222.grm, 223.grm, . . . 999.grm, assuming N=3). Each such speech recognition grammar preferably specifies the valid utterances starting with the N characters that correspond to the particular sequence of N telephone digits. For example, the grammar for the sequence "234" would contain any and all valid strings starting with ADG, AEH, BEG, and other ordered combinations of {ABC}, {DEF} and {GHI}. Each such string preferably corresponds to a valid search query that may be uttered by users.

In accordance with one method for selecting between these telephone digit based grammars, a user who is conducting a search by telephone is prompted to enter the first N characters of the search query on the telephone keypad through N telephone keypad depressions. The grammar corresponding to the N telephone digits entered by the user (e.g., 542.grm) is then selected for use in interpreting the user's utterance of the full search query. The grammar is thus selected without requiring the user to uniquely specify the N characters of the search query. One variation of this method is to allow or require the user to utter the N telephone digits rather than depressing the corresponding keys.

In accordance with another method for selecting between the telephone digit based grammars, the user is prompted to utter the first N characters of the search query, such that these characters are specified without use of the telephone keypad. The resulting sequence of N characters identified by the speech recognition system is then translated into its corresponding sequence of N telephone digits (e.g., "HARR" would be converted to "4277"). The grammar corresponding to this sequence of N telephone digits is then selected for use in interpreting the user's utterance of the full search query. One important attribute of this method is that the correct grammar is selected even if the speech recognition system interprets the utterance of one character as an utterance of a similar sounding character appearing on the same telephone key. For example, the correct grammar may be selected even if an utterance of "B" is recognized as an utterance of "C", or vice versa.

In accordance with another feature, a set of "fault-tolerant" grammars may be generated and used to protect against misinterpretations of utterances of predefined sets of similar sounding characters, including but not limited to similar sounding characters appearing on the same telephone key. For example, the grammars may be generated, and may be selected for use based on a set of N characters uttered by a user, such that the correct grammar is selected even if an utterance of "B" is interpreted as an utterance of "P" or vice versa.

Neither this summary nor the following detailed description section is intended to define the invention. The invention is defined by the claims.

BRIEF DESCRIPTION OF THE DRAWINGS

These and other features will now be described with reference to the drawings summarized below. These drawings and the associated description are provided to illustrate preferred embodiments of the invention, and not to limit the scope of the invention.

DETAILED DESCRIPTION OF THE PREFERRED EMBODIMENTS

A system and associated methods are disclosed for reducing the grammar space needed when searching a large database or domain using speech recognition processes, and for reducing the need for keyboard entry of search queries. Various methods are also disclosed for generating speech recognition grammars, and for selecting such grammars for use based on input from a user/searcher.

For purposes of illustrating one particular application, these and other inventive features will be described primarily in the context of a system for allowing users to search a catalog of creative works represented within a database (e.g., book, music, and/or video titles). It will be recognized, however, that the disclosed features may also be used for conducting searches for other types of items, such as physical products other than creative works, web sites and pages indexed by a crawler, documents, downloadable music files, companies, chat rooms, court opinions, telephone numbers, and other users.

For purposes of illustration, it may be assumed throughout the description that each item (work) is represented in the database as a record containing multiple fields, each of which contains a particular type of data (e.g., author, title, subject, description, etc.). The term "item" will be used generally to refer both to the items themselves and to the database records for such items. The term "author" will be used to refer generally to a person or entity who contributed to a work, such as a writer of a book, an artist or group associated with a musical work, or an actor or producer of a movie.

The disclosure of the various inventive features is arranged as follows. Section I, which corresponds to FIGS. 1-3, describes an embodiment in which the user (searcher) is asked to supply a set of characters of the search query (by voice and/or telephone keypad), and in which this set of characters is then used to conduct an initial search. The results of the initial search are then used to dynamically generate a grammar for interpreting the user's utterance of the full search query. These grammars may also be cached or pre-generated, reducing or eliminating the need to conduct such initial searches.

Figure 4:
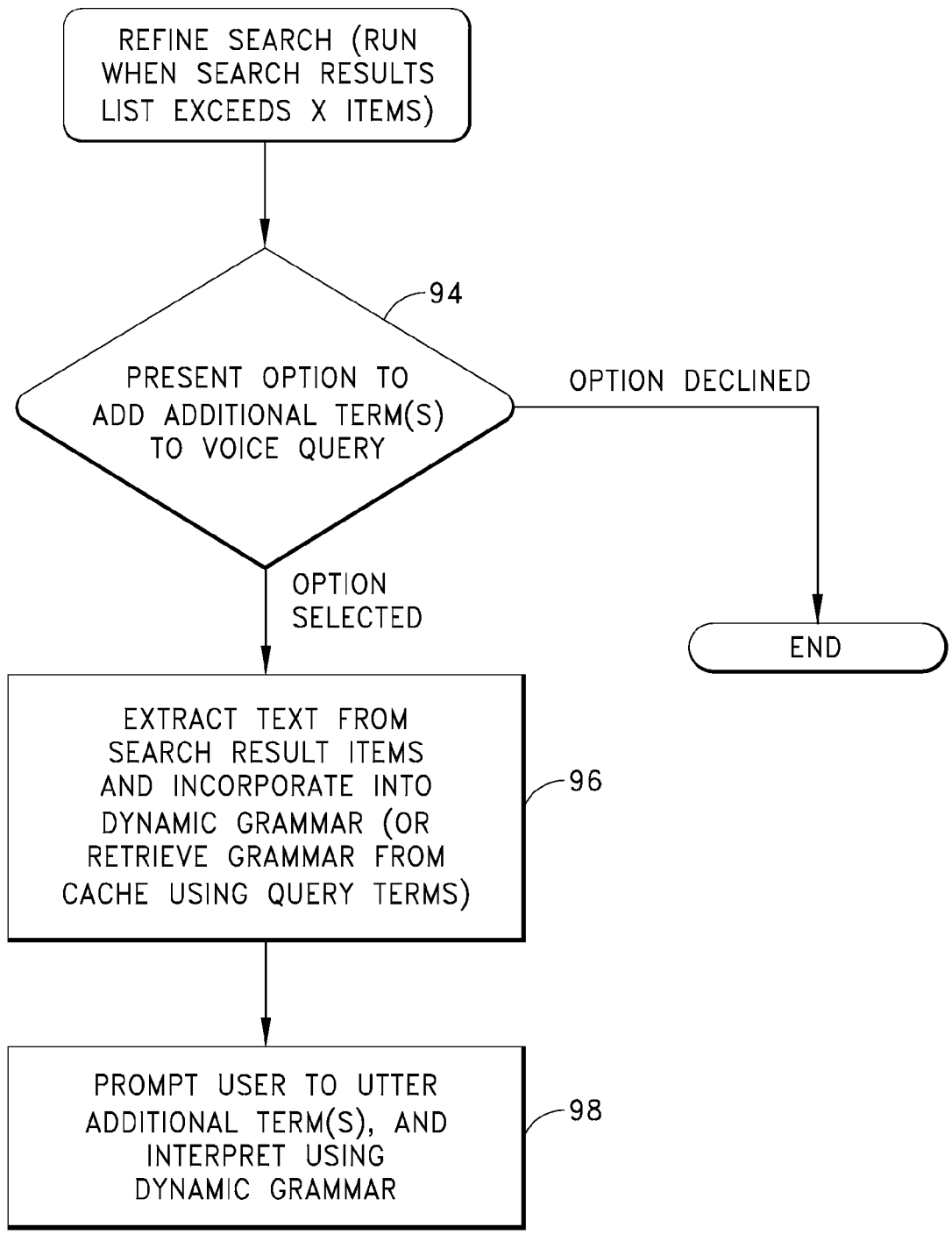
FIG. 4 shows a process for improving speech recognition reliability when a user refines a search by voice.

Section II, which corresponds to FIG. 4, illustrates a process for improving speech recognition accuracy when a user wishes to add one or more terms to an existing search query to refine a search.

Figures 5, 6:
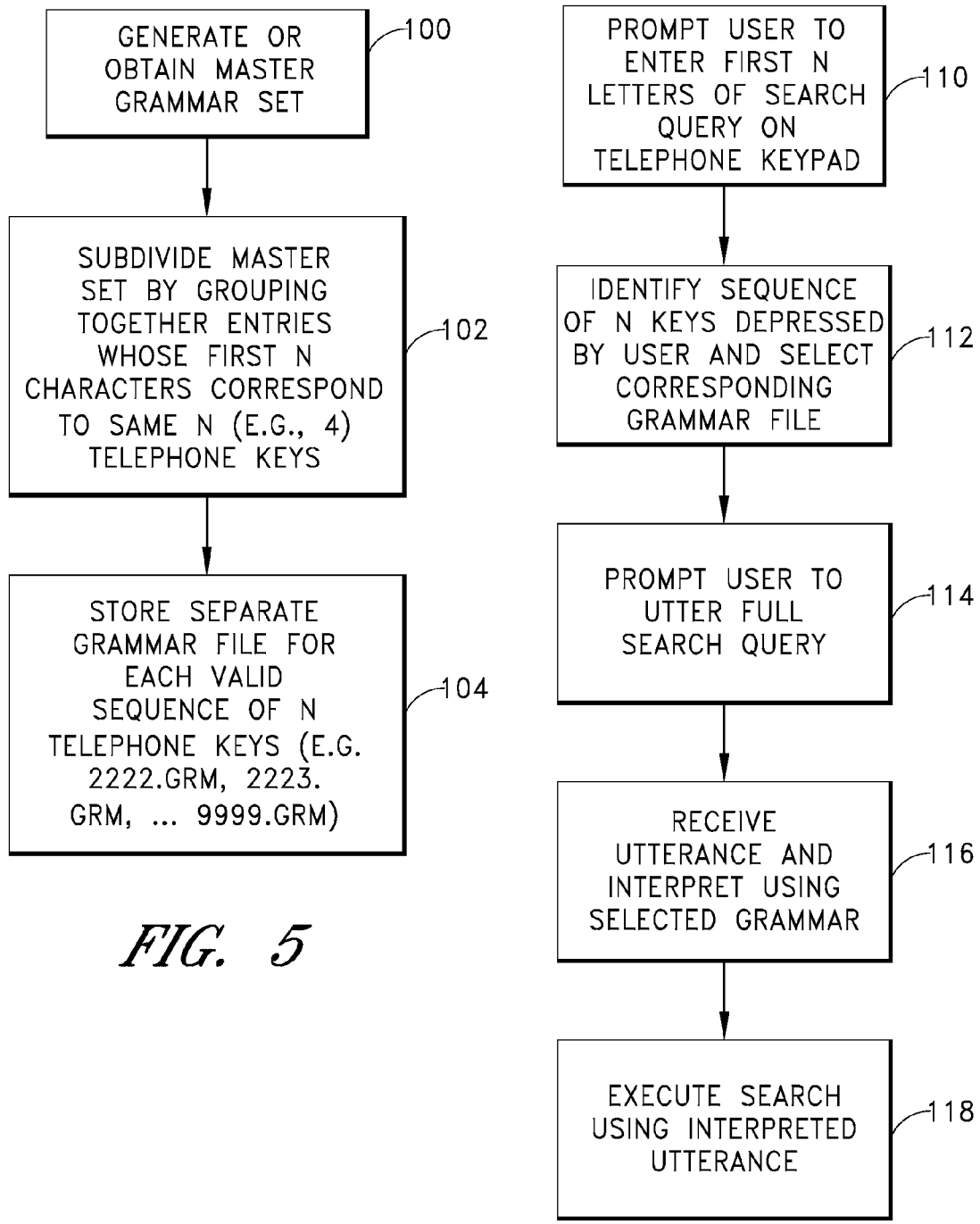
FIG. 5 illustrates an off-line process for generating grammars that correspond to different combinations of N telephone digits.
FIG. 6 illustrates a process in which grammars generated according to the method of FIG. 5 are selected for use in response to entry by a user of an initial set of characters of a search query on a telephone keypad.
Figure 7:
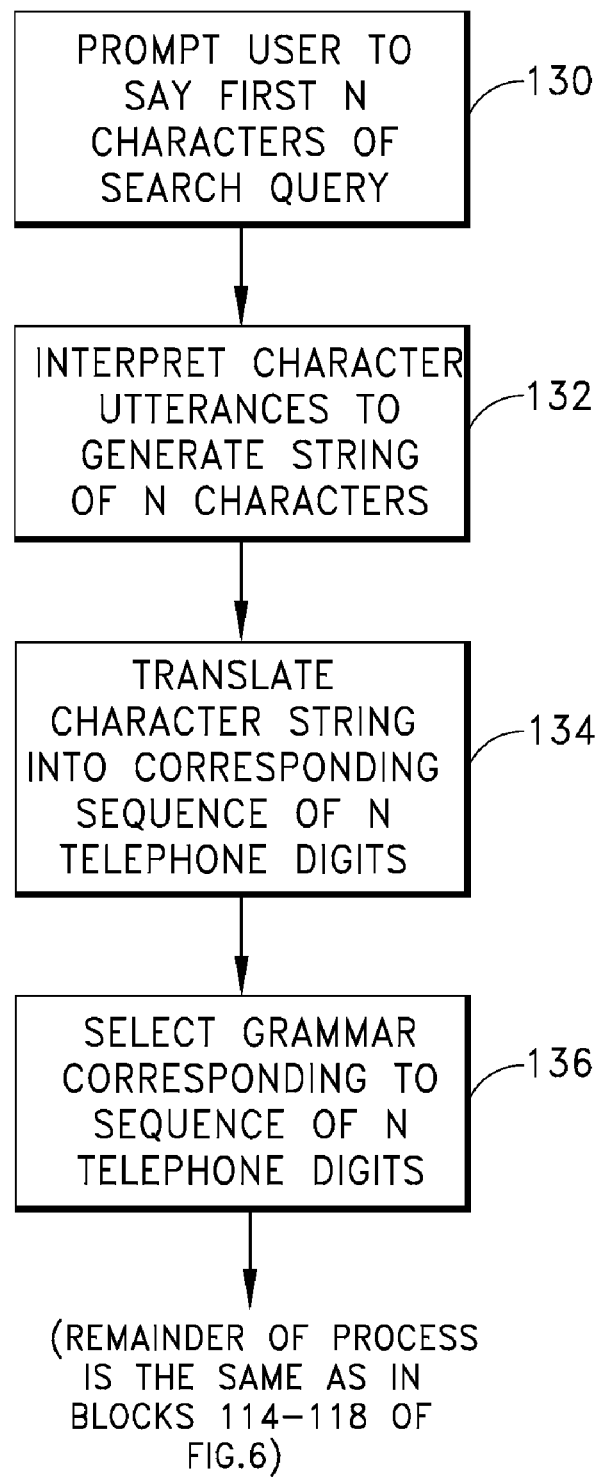
FIG. 7 illustrates a process in which grammars generated according to the method of FIG. 5 are selected for use in response to utterances by a user of an initial set of characters of a search query.

Section III, which corresponds to FIGS. 5-7, illustrates a process by which speech recognition grammars may be pre-generated for each of multiple combinations of N telephone digits (e.g., 2222.grm, 2223.grm, . . . 9999.grm). These grammars are preferably selected for use to interpret an utterance of a full search query based on either (1) the user's non-disambiguated entry on a telephone keypad of the first N characters of the search query, or (2) utterances by the user of these characters.

Figures 8, 9:
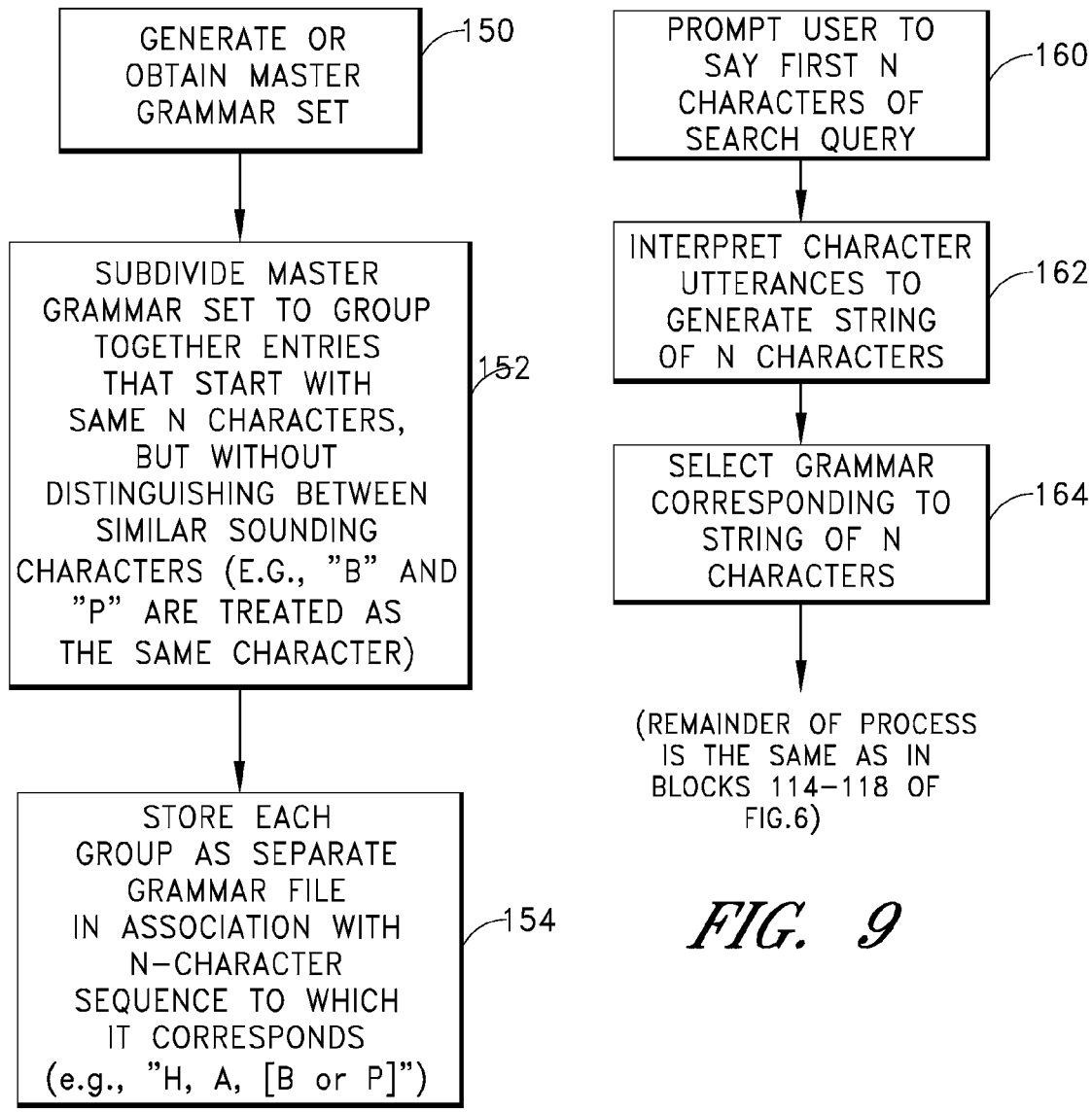
FIGS. 8 and 9 illustrate a process by which grammars may be generated and used so as to provide fault tolerance against the misidentification of uttered characters.

Section IV, which corresponds to FIGS. 8 and 9, discloses a process by which a set of "fault-tolerant" speech recognition grammars may be generated and used to protect against misinterpretations of utterances of similar sounding characters. With this process, if the speech recognition system misinterprets one or more character utterances by selecting similarly sounding characters, the correct speech recognition grammar may still be selected for use.

Figure 10:
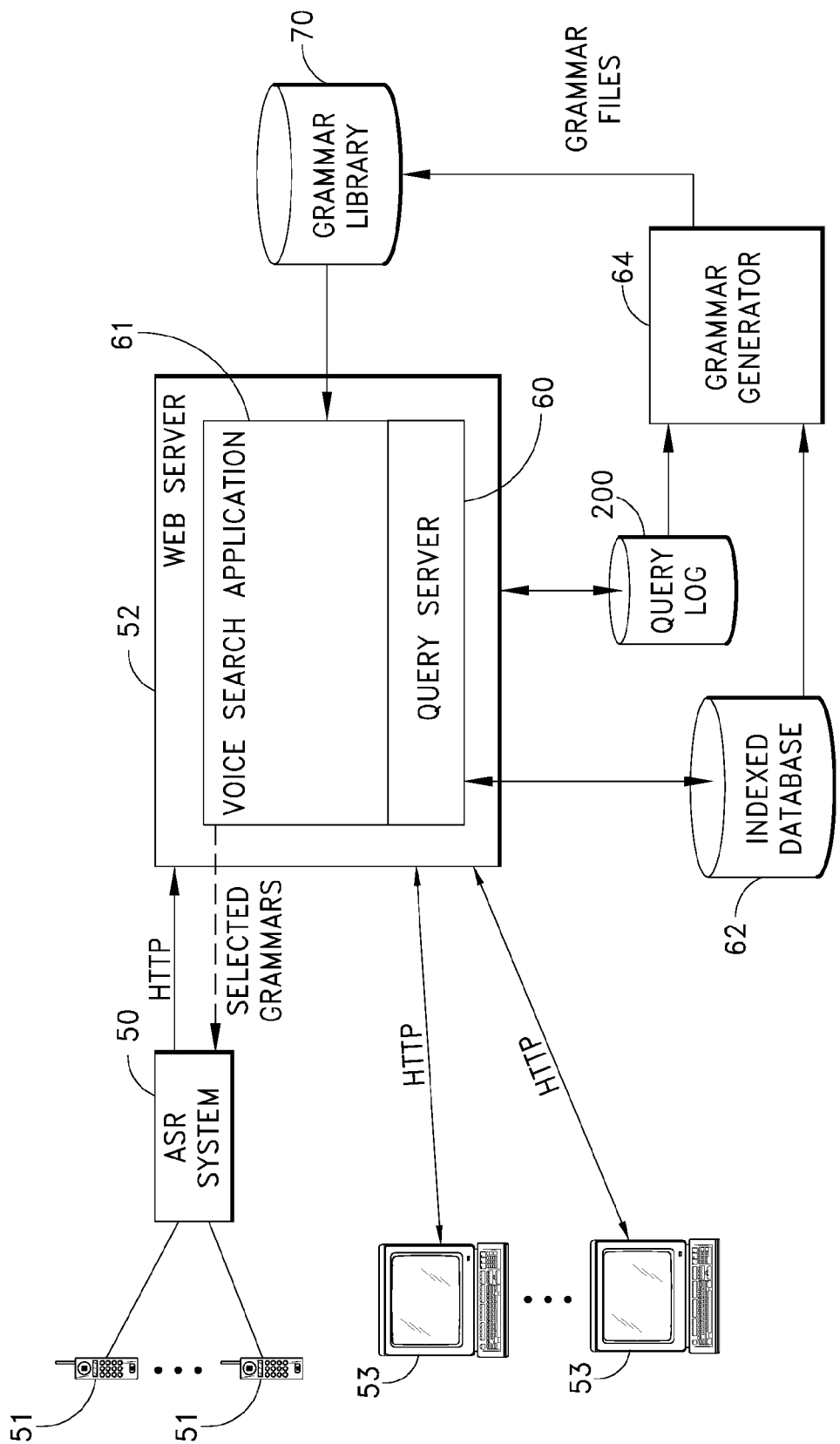
FIG. 10 illustrates a web site system which maintains a query log, and uses this query log to generate speech recognition grammars.
Figure 11:
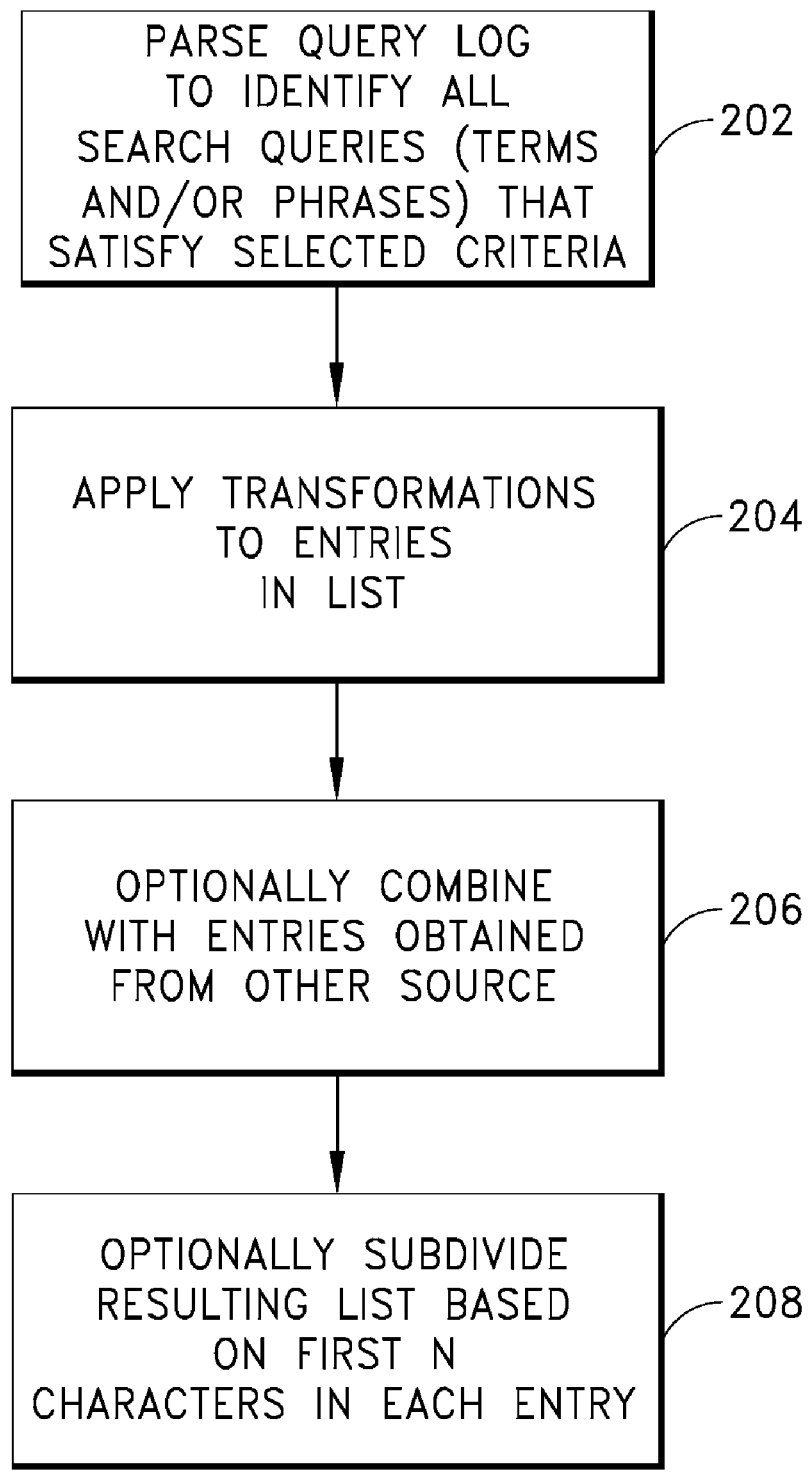
FIG. 11 illustrates a process by which the query log may be used to generate speech recognition grammars in the system of FIG. 10.

Section V, which corresponds to FIGS. 10 and 11, discloses a process for generating speech recognition grammars by selecting search queries (terms and/or phrases) from a query log. The search queries may be selected for inclusion in a grammar or grammar set based on a variety of criteria, such as frequency of use, whether the search query produced a NULL search result, and/or whether the query led to a positive reaction by the user.

As will be apparent, these and other inventive processes may be embodied individually or in any appropriate combination within a given database access system, including but not limited to web-based database access systems.

Parenthetical reference numbers throughout the following description refer to process steps or tasks in the flow diagrams. Unless indicated otherwise, it may be assumed that these process steps are implemented within software executed by one or more general purpose computers. Reference numbers without parenthesis refer to system components shown in FIGS. 2 and 10.

Figure 2:
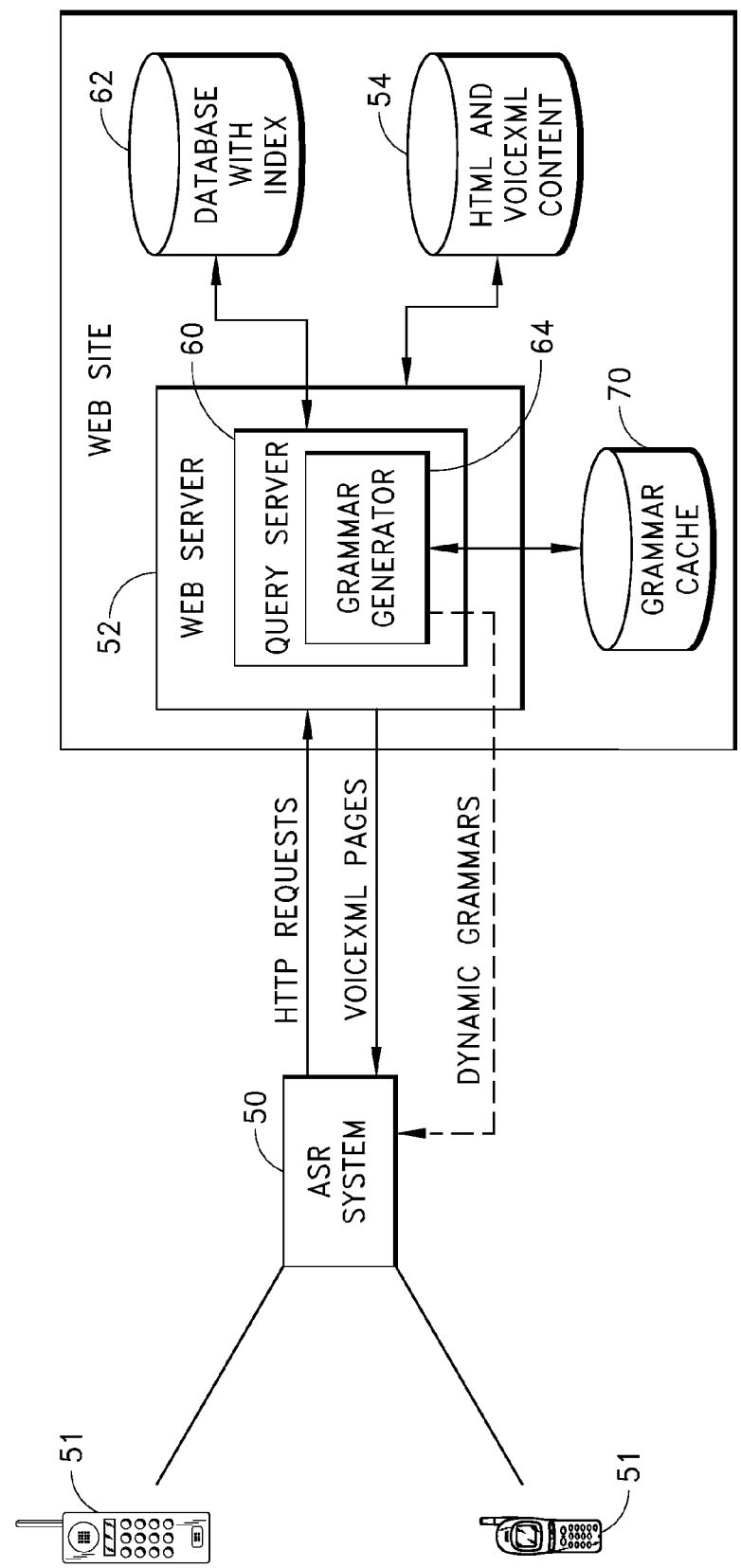
FIG. 2 illustrates a web-based system in which the invention may be embodied.
Figure 3:
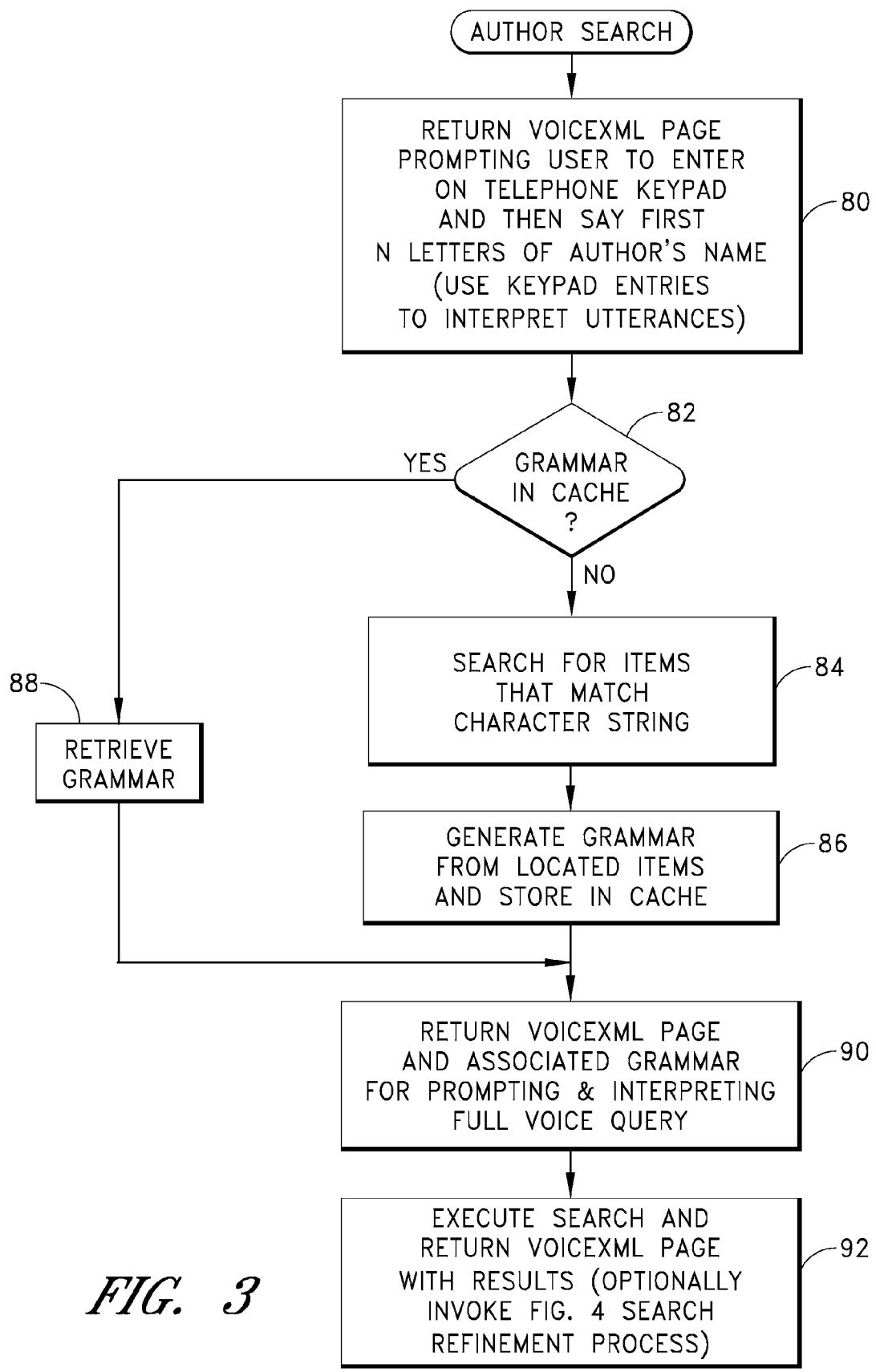
FIG. 3 illustrates a more detailed implementation of the process shown in FIG. 1, as applied to author searches in the context of the system of FIG. 2.

I. Dynamic Grammar Generation Based on Search Results (FIGS. 1-3)

Figure 1:
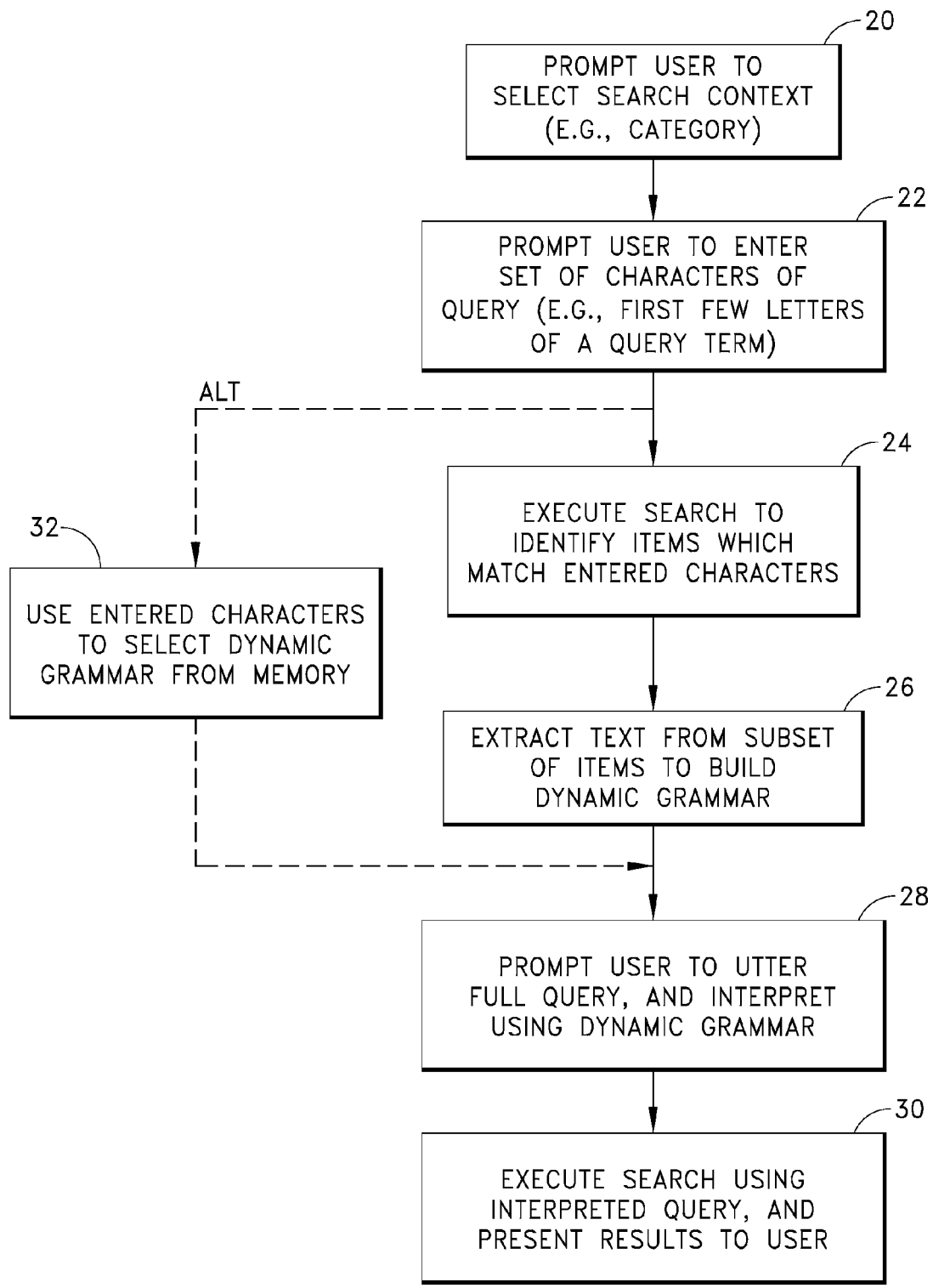
FIG. 1 illustrates a process for improving speech recognition accuracy of voice queries.

FIG. 1 illustrates a search process according to one embodiment of the invention. This process, and the processes described in the subsequent sections, may be implemented through executable code and associated content of a web site or other system that provides speech searching capabilities. A conventional automated speech recognition (ASR) system that interprets voice according to externally supplied grammars may be used to implement the speech recognition tasks.

As depicted by FIG. 1, the user may initially be prompted (by text or by voice) to select a search category or other context for performing the search (20). For example, the user may be prompted to select between books, music, videos, etc., and/or may be prompted to select between an "author search" (a field-restricted search in which the user specifies a name of an author) and a "title search" (a field-restricted search in which the user supplies one or more terms from the work's title). The selection may be made, for example, by clicking on a menu item or by providing a specified voice entry, depending upon the type of device and interface used. In another embodiment, only one search category may be made available so that the user need not select a category. In addition, the user may be permitted to submit queries that are not limited to a specific database field.

As further illustrated by FIG. 1, the system then prompts the user (by voice or by text) to enter a set or string of characters of the query—preferably the first one or more characters of a particular type of query term (22). The type of the query term may be dependent upon the context of the search. For example, if the user is conducting an author (artist) search for music titles, the user may be prompted to enter the initial letters of the name of an artist or musical group. The characters may be entered by the user by voice, a telephone keypad, a partial or full keyboard, or a combination of the foregoing. One particular method for entering characters using a combination of a telephone keypad and voice is disclosed in the description of FIG. 3.

The purpose of obtaining the set of characters is to narrow the scope of the search to a particular subset of the collection of items being searched. This in turn allows a significantly smaller and more tailored grammar to be used to process the full voice query. As described below, the grammar is preferably generated from the query terms that may be used in the full query to describe the items falling within the subset. Although the user is preferably prompted to enter the first one or more characters of a query term, the user could alternatively be prompted, for example, to enter any consecutive string of characters of a query term, or to enter the first character of each term in the query (e.g., the first and last initials of an author).

As further illustrated in FIG. 1, the characters entered by the user are used to conduct an initial search for all matching items (works) within the database (24). For example, if the user is conducting an author search and has entered the first three letters of the author's name, a preliminary search would be conducted for all works having authors that start with these characters. This preliminary search is performed transparently to the user.

The subset of items identified by this initial search is used to dynamically build a grammar for interpreting the full voice query (26). One method that may be used to generate the grammar is to simply build a list of all of the unique terms that appear in the relevant field or fields of the subset of items. For author searches, for example, this list would include all of the unique author names of the matching items; and for subject searches, the list would include all of the unique subject terms. To improve the reliability of the ASR process, the grammar may also define certain phrases as valid utterances. For example, for the author Stephen King, the grammar may define the following valid utterances: "Stephen," "King," and "Stephen King."

Although the grammar is preferably generated directly from the matching items, other types of criteria may optionally be incorporated into the grammar generation process. For example, if a set of preferences for the user indicates that he does not like a particular type of item (e.g., works from a particular author or works exceeding a particular price threshold), these items may be filtered from the subset before generating the grammar. Further, voice commands such as "new search" or "go back" may be added to the grammar.

Referring again to the character entry task (22) in FIG. 1, the number of characters entered by the user is ideally sufficiently large to produce a grammar that falls below a certain size threshold, such as 5000 valid utterances. The number of characters needed to provide the desired grammar size will typically depend largely on (1) the number of items in the domain being searched, (2) the database field or fields used to generate the grammar from the subset of items (e.g., author only, subject only, author plus title plus subject, etc.), and (3) particular method used to select valid utterances from the relevant fields. In some embodiments, the user may be prompted to enter a fixed number of characters (e.g., 1, 2, 3, or 4), with this number being selected based on the context of the search (e.g., the category and type of the search). In other embodiments, the user may be permitted to enter any desired number of characters. In addition, the system could calculate the grammar size in real time as the user enters the characters, and notify the user once the number of entered characters is sufficient to produce the desired grammar size.

As further shown in FIG. 1, after the user has entered the first few letters of the query, the user is prompted, vocally or textually, to submit the full query by voice (28). The ASR system interprets the voice query using the dynamically generated grammar. Typically, this task involves converting the utterances into corresponding character strings, and providing these strings to a conventional query server. Because the grammar is derived from a relatively small subset of items and is thus relatively small in size, the ASR process is significantly more accurate.

As depicted by the dashed line path in FIG. 1, rather than generating a grammar each time a search is performed, the appropriate grammar could alternatively be retrieved from memory in response to the character input (32). For example, once a grammar is generated, the grammar may cached in memory for a defined period of time (e.g., one day, or until the database is updated) so that it does not have to be regenerated each time the same character string is received. Alternatively, a hybrid approach may be used in which only the grammars for the most frequently used character strings are cached. Further, rather than using a caching scheme, the grammars for some or all of the possible character combinations could be generated periodically by an off-line process.

As depicted in FIG. 1, the ASR system 50 outputs a text version of the query, and this textual search query is used to conduct a search using conventional query processing methods (30). To reduce processing time and resources, the scope of this search may be limited to the subset of items identified during the preliminary search. The results of the search may be presented to the user by text or by voice using conventional methods.

FIG. 2 illustrates a typical web site system in which the FIG. 1 process may embodied, and shows some of the components that may be added to the system to implement the process. In this system, users can browse the web site using either a conventional web browser (not shown) or using the site's voice interface. Users of the voice interface connect to the site by establishing a telephone connection to a conventional ASR system 50 from a mobile or landline telephone 51. The ASR system may, but need not, be local to the web server. As illustrated, the ASR system sends HTTP requests to the web server, and receives voiceXML pages from the web server.

As shown in FIG. 2, the web server 52 accesses a repository of HTML and VoiceXML content 54 that is used to generate dynamic HTML and voiceXML pages. Page requests generated by the ASR system 50 are normally only for voiceXML pages (i.e., correspond only to the URLs at which voiceXML pages are located). These voiceXML pages define the system's voice interface. As is conventional, the voiceXML pages specify speech or other audio to be played to the user by the ASR system during a browsing session. The voiceXML pages also contain grammars (in the form of text files) for specifying the valid utterances that can occur at a given state.

As further shown in FIG. 2, the web server 52 includes a query server 60 for allowing users to search an indexed database 62, such as a product database of an online merchant. The items represented within the database may include works such as book, music and video titles. The query server 60 includes or is linked to a grammar generator 64 that generates tailored, reduced-size grammars according to the process of FIG. 1. The query server 60 and grammar generator 64 are preferably implemented within software which runs on a general-purpose computer, but could alternatively be implemented in-whole or in-part within specialized hardware to provide a higher level of performance. The grammar generator 64 may access a cache 70 or other grammar storage system for permitting re-use of the dynamic grammars, as described above.

FIG. 3 illustrates a preferred process by which voice-based author searches are performed within the FIG. 2 system, according to the method of FIG. 1. The process is implemented within the executable code of the query server 60 together with associated voiceXML pages. The author search may, but need not, be limited to a particular category of items (books, music, videos, etc).

Initially, a voiceXML page is sent to the ASR system prompting the user (by voice) to type in, and then say, the first N letters of an author's name (80). For example, if the user is searching for music titles by the artist Sting, the user might initially type "784" on the telephone keypad and then say the letters "STI." The ASR system uses each the keypad entry to narrow the set of valid utterances associated with each spoken letter. For example, for the telephone digit "2," the ASR system would only recognize the letters A, B and C as valid utterances, rather than all twenty six letters of the alphabet. This method of character entry significantly reduces misinterpretations by the ASR system of characters having similar sounds.

The character entry task can be varied, for example, by having the user utter each character immediately after the corresponding telephone key has been depressed, or by having the user utter all of the characters prior to their entry on the keypad. In addition, any of a variety of alternative character entry methods could be used, including methods that use only voice or only the telephone keypad. For example, a method could be used in which the user depresses each telephone key a number of times equal to the position of the desired letter, as is common for programming cellular phones. Upon receiving the user's character string from the ASR system, the query server 60 checks the grammar cache 70 (if caching is used) to determine whether a grammar corresponding to the user's search context and character string exists (82).

If no such grammar exists, or if no caching is used, the query server 60 performs an initial search of the appropriate domain (e.g., music) of the product database 62 for all author names starting with the N characters (84). The query server then invokes the dynamic grammar generator 64 to build a grammar from these author names. As mentioned above, in embodiments in which the search engine permits the user to utter other types of terms (such as title terms) along with the author terms, the grammar generator may also incorporate these types of terms into the grammar. For example, the grammar could be derived from the author names and titles of the works located by the initial search. Once generated, the grammar may be stored in the cache 70 together with such information as the character string and search context to which it corresponds and the date and time of creation.

Once the grammar has been generated (86) or read from the cache (88), the grammar is incorporated into a voiceXML page which is provided to the ASR system (90). This page prompts the user by voice to utter the full query. The ASR system 50 interprets this voice query using the supplied grammar, and returns to the web/query server an HTTP request containing the full query in textual form. The query server 60 then executes the search (optionally limiting search's scope to the items located during the initial search), and generates and returns a voiceXML page containing the search results (92).

II. Search Query Refinement Process (FIG. 4)

FIG. 4 illustrates another process for improving speech recognition accuracy of query terms. The process involves generating a dynamic grammar for conducting a refined search after an initial search has been performed. The process may be used independently or in combination with the processes described above. As depicted in FIG. 4, when a user submits a voice query that generates more than a threshold number a hits (e.g., over 20), the user is given the option to refine (narrow) the search by adding one or more terms to the query (94). For example, the user may hear the following voice response: "Your search for <query> returned <hits> items; would you like to add additional terms to your query?"

To increase speech recognition reliability as these additional terms are uttered, the query server 60 generates a dynamic grammar from the initial set of search results (96). The grammar generation methods described above may be used for this purpose. This dynamic grammar is then provided to the ASR system 50 (e.g., within a voiceXML page) and is used to process the voice entry (98). Grammars for the most frequently submitted search queries may be cached in the same manner as described above, except that the grammars would be stored and retrieved using the original set of query terms.

III. Searches Using Grammars Corresponding to Telephone Keys (FIGS. 5-7)

In the process depicted in FIG. 3, the user uniquely specifies an initial set of N characters of the search query to be uttered. One variation to this approach is to have the user merely depress the corresponding N telephone keypad keys, without uniquely indicating the intended characters. This sequence of N keys is then used to select a corresponding grammar to be used to interpret the user's utterance of the full search query.

For example, if the user wishes to submit the query "HARRY POTTER," the user may initially enter "4 2 7 7" on the telephone keypad (assuming in this example that the user is prompted to enter the first four characters of the search query), and then say the phrase HARRY POTTER. To interpret the utterance, the system would use a previously-generated grammar corresponding to the telephone keys 4 2 7 7. This grammar would preferably specify all of the valid utterances (character strings) that correspond to these four telephone keys. More specifically, this grammar would preferably contain all valid utterances that start with one of the 144 possible 4-character sequences resulting from taking one character from each of the following sets: {GHI}, {ABC}, {PQRS} and {PQRS}. Despite the large number of permutations in this example, the resulting grammar may still be relatively small, as only a relatively small number of these permutations may exist as initial character strings in the database to be searched.

An important benefit of this approach is that the user can typically perform the search with a reduced number of steps in comparison to the method of FIG. 3. For example, rather than being asked to enter and then say the first three characters of the search query, the user may simply be prompted to enter the first three of four characters and then say the entire search query. Another benefit is that the grammar is selected without relying on the accuracy of the speech recognition process.

FIG. 5 illustrates an off-line process that may be used to generate the grammars for each of the valid sequences of N telephone keys that may be entered by a user. It may be assumed for purposes of illustration that N=4 (as in the example above), although a different value such as 2, 3, or 5 may alternatively be used. The first step (block 100) in this process is to generate or obtain a master grammar set that contains substantially all of the valid search terms and phrases (e.g., "INTO THIN AIR") that may be used to search the particular database 62 or domain of items by voice. The master grammar set may be generated by extracting terms and phrases from the item records within this database 62 or domain. One algorithm that may be used for this purpose is disclosed in U.S. application Ser. No. 09/729,646, filed Dec. 4, 2000, the disclosure of which is hereby incorporated by reference. This master grammar set may also be generated by extracting search queries from a query log as described below in section V. Further, the master grammar set may be a pre-existing grammar file obtained from any appropriate source.

The next step (block 102) is to subdivide the master grammar set by grouping together those entries whose first N characters correspond to the same N telephone keys. For example, all entries that begin with HARR, HAPP, GARS, or any of the other combinations associated with the character sets {GHI}, {ABC}, {PQRS} and {PQRS}, would be grouped to together to form the grammar for the telephone keys 4 2 7 7. Each grouping is then stored as a separate grammar file (block 104) in association with the telephone digits to which it corresponds (e.g., 2222.grm, 2223.grm, ... 9999.grm). Depending on the value of N used, the master grammar may be subdivided into many hundreds or thousands of separate grammar files during this phase of the process. The grammar files may be stored in any appropriate grammar format, such as Nuance's Grammar Specification Language, the W3C's GRXML format, or the Java Grammar Specification Language.

In some implementations, users may be prompted to use one or more of the "non-alphabetic" telephone keys (1, 0, * and #) to enter special characters. For example, in one embodiment, users are instructed to use the "*" key for all punctuation. In such cases, these keys and their associated character assignments are incorporated into the grammar generation process. For instance, assuming the "*" key is used for punctuation, the grammar file 23*4.grm would be generated to accommodate search queries beginning with {ABC}, {DEF}, {any punctuation}, {GHI}.

The process depicted in FIG. 5 may be repeated periodically so that the grammar files are always sufficiently up-to-date. For example, if the grammars are generated by extracting terms and phrases from item records in the searchable database, new grammars may be generated whenever new items are added to the database. If the grammars are generated in-whole or in-part by extracting search queries from a query log, new grammars may be generated more frequently (e.g., every hour) so that they strongly reflect the current search patterns of users. The process shown in FIG. 5 may also be repeated using a different value for N.

FIG. 6 illustrates the above-described process by which users conduct searches using grammars generated according to the method of FIG. 5. The user is initially prompted by voice to enter the first N letters of the search query on the telephone keypad (block 110). For example, the user may hear the following voice prompt: "Using your telephone keypad, please enter the first four letters of your search query." In some embodiments, the user may be permitted to decide how many characters to enter.

The system then identifies the N keys depressed by the user (by detecting the corresponding DTMF tones), and selects the corresponding grammar file (block 112). For instance, if the user enters 7 7 8 9, the grammar file 7789.grm would be selected for use. The grammar file is thus selected without attempting to uniquely identify the N characters intended by the user. In the context of the example system depicted in FIG. 2, this grammar file would be transmitted to the ASR system 50 as part of a voiceXML page.

Although not depicted in FIG. 6, the user may also be given the option—or may be required—to alternatively speak the number of each telephone key. Using the example above, the user might then utter the numbers 7 7 8 9 rather than depressing the corresponding telephone keys. The grammar would still be selected in the same manner, but based on the ASR system's interpretation of the number utterances. Because speech recognition systems can accurately recognize utterances of the digits 0-9, the risk of selecting the wrong grammar file with this method tends to be low.

With further reference to FIG. 6, the user is also prompted to utter the full search query (block 114), and the resulting utterance is interpreted (converted to a corresponding text string) using the selected grammar file (block 116). Because each grammar file is typically much smaller than the master grammar set, the accuracy of this interpretation step (block 116) is much greater than would be the case if the master grammar were used. Assuming the ASR system 50 matches the search query utterance to a text string in the grammar file, the resulting text string is submitted to the query server 52 as a search query (block 118), and the results are returned to the user. If no matching text string is found by the ASR system, the user may be prompted to say the search query again, or possibly to repeat the entire process. Once the search query has been executed, the process depicted in FIG. 4 may optionally be used if the user chooses to refine the search query.

As will be apparent, the process steps need not occur in the sequential order shown in FIG. 6. For example, the task of selecting the grammar file may be performed concurrently with or after the user's utterance of the complete search query. In addition, the user may be prompted to utter the complete search query before the user is prompted to enter the first N characters of the search query; the utterance of the search query may then be stored until the appropriate speech recognition grammar has been selected. The same is true with the methods depicted in FIGS. 3, 7 and 9.

FIG. 7 illustrates another search method that may be supported by a system, such as the system of FIG. 2, using grammars generated according to the method of FIG. 5. With this method, the user is prompted to say the first N letters of the search query, rather than to select these letters on the telephone keypad. Both methods (FIGS. 6 and 7) may be implemented within a given system to provide greater flexibility to users. As discussed below, an important attribute of the FIG. 7 method is that it selects the correct grammar in many cases even if the speech recognition system misinterprets one or more character utterances.

As depicted in FIG. 7, the system initially prompts the user to say the first N (e.g., 4) letters of the search query (block 130), and then interprets the resulting utterances to generate a string of N letters (block 132). The system then translates this sequence of N letters into the corresponding sequence of N telephone digits (block 134). For example, if the system detected the letters "B E A D", the system would translate this string into the sequence "2 3 2 3." As depicted by block 136, the system then selects the grammar associated with this sequence of telephone digits (e.g., 2323.grm), and uses this grammar to interpret the user's utterance of the full search query.

To illustrate the degree of fault tolerance provided by this method, assume that the user actually utters "B E A D", but that the speech recognition system 50 mis-identifies the first uttered character as "C"; misidentifies the second uttered character as "D"; and/or misidentifies the fourth uttered character as "E". (Speech recognition systems commonly have difficulty distinguishing between "B" and "C" and between "D" and "E".) In any of these scenarios, the correct grammar (2323.grm) will still be selected, since B and C appear on the same telephone key and since D and E appear on the same telephone key.

In the following subsection, a process is described which extends the system's fault tolerance to also protect against misinterpretations between letters that do not appear on the same telephone key.

IV. Searches Using Fault-Tolerant Grammars (FIGS. 8 and 9)

The process depicted in FIG. 7 selects the correct grammar if the ASR system interprets the utterance of one alphabetic character as an utterance of another character appearing on the same telephone key. However, speech recognition systems also have difficulty distinguishing between utterances of certain alphabetic letters that do not appear on the same telephone key. For instance, an utterance of "B" is often interpreted as an utterance of "D" (and vice versa). In addition, utterances of "A" and "K" are commonly confused with each other, as are utterances of "A" and "H".

To protect against such recognition errors, the master grammar set may be subdivided such that whenever the utterance of a character is mis-recognized as an utterance of a character falling within a predefined set of similar sounding characters, the resulting character string still maps to the correct speech recognition grammar. This is preferably accomplished by grouping together those search queries that start with the same N characters when similar sounding characters are treated as the same character. With this approach, if two search queries start with the same N characters when similar sounding characters are treated as the same character, these two search queries will be stored in the same grammar.

By way of example, assume that the characters A, K and H are identified as similar sounding characters. Assume also that the user (searcher) is asked to utter the first three letters of the search query, and that the user utters the letters "R O A". In accordance with the invention, the same speech recognition grammar will be selected regardless of whether the speech recognition system 50 detects ROA, ROK or ROH. This grammar preferably consists of all valid search queries that start with "ROA," "ROK" or "ROH" (assuming in this example that neither "R" nor "O" are part of a set similar sounding characters). This grammar may, for example, be designated by the descriptor "R, O, {A or K or H}".

This method also protects against the mis-recognition of multiple characters. For example, assume that {B, C and P} form one set of similar sounding characters, and that {A, K and H} form another. Assume also that the user utters the sequence "B O A". This utterance would map to the grammar "{B or C or P}, O, {A or K or H}" regardless of whether the speech recognition system detects BOA, BOK, BOH, COA, COK, COH, POA, POK or POH. (It is again assumed in this example that "O" is not a member of a set of similar sounding characters.) This grammar would contain all valid search queries that start with any of these nine three-letter sequences.

FIG. 8 illustrates a process that may be used to generate a complete set of grammars in accordance with this aspect of the invention. It may be assumed that one or more sets of similar sounding characters have been defined by system administrators prior to execution of this process. As with the method of FIG. 5, the first step (block 150) is to generate or obtain a master grammar set from an appropriate source. This master grammar set is then subdivided into multiple subsets—each of which corresponds to a different respective sequence of N characters—treating similar sounding characters as the same character (block 152). Finally, each group or subset of strings is stored (block 154) as a respective grammar file in association with its N-character sequence or sequences. For example, separate grammars may be stored for each of the following:

F, O, (A or K or H)

F, O, (B or C or D or E or G or P)

F, O, F

F, O, I

With the first two of these grammars, several different N-character sequences map to the same grammar to protect against speech recognition errors. The third and forth grammars, on the other hand, each correspond to only one respective N-character sequence, as the characters F, O and I are not members of a set of similar sounding characters in this example.

For purposes of generating the grammars, one of the sets of similar sounding characters is preferably formed by grouping together some or all of the letters ending with the "ee" sound (B, C, D, E, G, P, T, V and Z).

FIG. 9 illustrates a process by which these grammars may thereafter be used to conduct voice-based searches. As with the method of FIG. 7, the user is initially prompted to utter the first N characters of the search query (block 160), and the ASR system 50 interprets these utterances to produce an N-character string (block 162). The grammar corresponding to this N-character string is then selected for use by the ASR system in interpreting the user's utterance of the full search query (block 164). Each possible N-character string maps to a single grammar file, although two or more N-character strings may map to the same grammar file. The rest of the process is the same as in FIG. 6.

The decision of whether to treat two characters as being similar sounding may depend upon the geographic locations of the users. For example, two letters may tend to be confused with each other when uttered by users in the United States, but not Canada. To better accommodate these differences between geographic regions, different groupings of similar sounding characters may be used to generate respective grammar libraries for different geographic regions. The appropriate grammar library may then be selected based on the location from which the user calls in to access the system.

V. Grammar Generation Using Query Logs (FIGS. 10 and 11)

A system and process will now be described for analyzing a query log to select search queries (terms and/or phrases) to include in, or possibly to exclude from, a speech recognition grammar.

By way of background, web sites and other types of systems that support interactive searching commonly maintain a query log reflective of actions performed by online users. These query logs commonly contain time stamped entries indicative of search queries submitted by users, together with associated data indicative of the results of such searches (e.g., the number of items found). The query log may also contain entries indicative of other types of user actions. These entries may be used, for example, to determine whether a user who submitted a search query thereafter selected a search result item for viewing. In the case of an online sales system, these entries may also be used to determine whether the user purchased a search result item, or added a search result item to a wish list or a shopping cart.

FIG. 10 illustrates one embodiment of a web site system that maintains such a query log 200, and uses this query log to generate speech recognition grammars. As illustrated, the query log 200 (or a most recent set of entries in the query log) is analyzed periodically by a grammar generator 64 to identify and extract specific search queries to include in one or more speech recognition grammars. These grammars are maintained in a grammar library 70, and are selected for use by a voice-based search application 61—optionally using one or more of the grammar selection methods described in the previous sections. Typically, the query log data used to generate a given grammar file or set includes search queries submitted by many thousands of different users.

As discussed below, any of a number of criteria may be used by the grammar generator 64 to select search queries to include in a grammar or set of grammars. For example, a grammar may be generated by selecting the 5000 most frequently used search queries submitted over the last N days or N hours, and/or by selecting all search queries that resulted in a shopping cart add, a wish list add, or a purchase. The grammar generator 64 may be executed periodically (e.g., once per hour) so that the grammar files in use by the system at any given point in time reflect recent search patterns of users.

In the preferred embodiment, the search queries contained in the query log 200 include search queries submitted by users without the use of voice, such as search queries typed into web forms via client computers 53. (As with the web site system of FIG. 2, the system depicted in FIG. 10 can preferably be browsed by voice using a telephone 51, and can also be browsed using an ordinary web browser running on a client computer 53.) These non-voice-based search queries are an important indicator of the search queries that are likely to be submitted by voice, as (1) users tend to use the same search queries regardless of whether they are searching by manual text entry or by voice, and (2) the non-voice-based search queries are not the output of an ASR system 50, and are thus less likely to represent something other than what the user intended. As will be recognized, however, grammar files may be generated in accordance with the embodiment of FIGS. 10 and 11 based solely on voice-based queries represented in a query log 200.

Although the grammar generator 64 operates in an "off-line" mode in the illustrated embodiment, the grammar generator could alternatively be implemented as a real time component. For example, the grammar generator 64 could monitor search query submissions in real time, and when a search query is executed that meets selected criteria (e.g., results in an item viewing event or a purchase), could add this search query to the relevant grammar if it is not already present. To prevent the grammar files from growing too large, a separate executable process could identify and delete those search queries that are the least frequently used.

FIG. 11 illustrates one example of a process that may be used by the grammar generator 64 to generate one or more grammars using the query log 200. Initially, the query log, or a most recent set of data in the query log, is parsed to identify all search queries that satisfy selected criteria (block 202). The criteria may, for example, be selected so as to exclude one or more of the following: (1) search query submissions that produced a NULL query result, (2) voice-based search query submissions, (3) search query submissions falling outside the search category for which a grammar set is now being generated, (4) search query submissions that do not correspond to the "type" of search (author search, title search, subject search, etc.) for which a grammar is now being generated, and (5) search queries that were submitted less than a threshold number of times over a selected time period.

The query selection criteria may also take into account whether, or to what extent, users who submitted a particular search query performed certain types of post-search actions. These post-search actions may include, for example, selecting a search result item for viewing (also referred to as a "click-through" event), adding a search result item to a shopping cart or a wish list, or purchasing a search result item. These and other types of post-search actions, as well as data regarding frequency of search query submission, may optionally be incorporated into a scoring algorithm that assigns a score to each unique search query extracted from the log 200. These scores may then be used to ultimately select the search queries to be included in a grammar or grammar set.

Where such scores are generated, they may also ultimately be included in the grammar files, and used to select between two or more close matches during the speech recognition process. For example, the search strings "HARRY POTTER" and "HAPPY POTTER" may coexist within the same grammar file, but the speech recognition system 50 may favor HARRY POTTER over HAPPY POTTER as the result of a higher score having been assigned to this search phrase during the grammar generation process.

Once the desired list or set of search queries has been generated, a set of transformations is applied to this dataset (block 204) to replace and/or expand certain types of character sequences. For example, in one embodiment, "Mr." is replaced by "mister," ".com" is replaced by "dot com," numbers are expanded to their word counterparts (e.g., "1999" is replaced with "nineteen ninety nine," "one thousand nine hundred ninety nine," and "one nine nine nine"), and ordinals are written out (e.g., "1st" is replaced with "first"). Other transformations that may be used are known in the art. Following this transformation step (204), all of the entries (search terms and phrases) in the list are in an appropriate form for use by a speech recognition system 50.

This list may optionally be combined with strings extracted from another source (block 206), such as the item records of the database 62 to be searched (as depicted in FIG. 10 by the dashed arrow from the database 62 to the grammar generator 64). For example, if new items were recently added to the searchable database but have not yet been the target of a search, it may be desirable to add selected terms and phases extracted from these new items to the grammar set. Further, the results of the query log analysis may be used to supplement a pre-existing grammar file or set with search strings not already included therein.

Finally, if the resulting grammar set is sufficiently large, it may be subdivided based on the first N letters of each entry to generate multiple grammar files. The method shown in FIG. 5 and the method depicted in FIG. 8 are both suitable for this purpose. If, on the other hand, the grammar dataset is sufficiently small (e.g., because it corresponds to a relatively small database 62 or domain of searchable items), the entire grammar set may be used for all search queries directed to the database.

The process shown in FIG. 11 may be repeated periodically, such as once per hour, to generate grammars that closely correspond to the current search patterns and trends of users. In doing so, the process may disregard, or accord a lesser weight to, query log data falling outside a certain time window. For example, the process may generate the grammars based solely on the last X hours of query log data.

The process may also be repeated and varied as needed to generate grammars for each category and/or type of voice based search that may be conducted by users. For instance, separate grammars may be generated for conducting each of the following: book searches, music searches, and video searches. In addition, separate grammars may be generated for conducting author searches, title searches, and subject searches within each item category.

Further, if the query log includes data indicative of the geographic regions of users, separate grammars may be generated for each such geographic region to accommodate differing vocabularies. For example, a speech recognition grammar may be generated for Australian users based solely or exclusively on query submissions from users in Australia.

Grammars generated in accordance with the method of FIG. 11 may be used to process voice-based search queries according to the methods of FIGS. 6, 7 and 9, although the method of FIG. 11 is not so limited.

Although the query log 200 is preferably used as a source of search strings to include within a grammar, it may also be used to identify search strings that are to be excluded. For example, where a grammar is generated by extracting strings from database records (or some other source other than the query log 200), the query log can be analyzed to determine whether some of these strings rarely appear within actual search query submissions. Those strings that rarely or never appear in actual search query submissions can then be deleted to reduce the size of the grammar.

In addition, the query log data can be analyzed in conjunction with database records to formulate a set of heuristics for extracting terms and phrases from database records.

Although the inventions have been described in terms of certain preferred embodiments, other embodiments that are apparent to those of ordinary skill in the art, including embodiments that do not provide all of the features and benefits described above, are also within the scope of this invention. Accordingly, the scope of protection is defined only by reference to the appended claims. For purposes of construing the claims, a method claim that recites multiple steps should not be construed as necessarily requiring that these steps be performed in the order in which they are recited.

What is claimed is:

1. A method of generating speech recognition grammars for conducting voice-based database searches, the method comprising:

maintaining a query log that stores search queries submitted to a query server by users;

selecting a plurality of search queries from the query log for incorporation into a speech recognition grammar, wherein selecting the plurality of search queries from the query log comprises taking into consideration frequencies with which specific search queries were submitted to the query server by users via a web browser without the use of voice;

incorporating the plurality of search queries into at least one speech recognition grammar that specifies valid utterances for conducting searches; and using the at least one speech recognition grammar to interpret utterances of search queries by users;

whereby information about search queries submitted by users without the use of voice is used to select, for inclusion in the speech recognition grammar, search queries likely to be used for searching by voice.

2. The method of claim 1, wherein selecting the plurality of search queries from the query log comprises taking into consideration post-search actions performed by users who submitted specific search queries.

3. The method of claim 1, wherein selecting the plurality of search queries from the query log comprises taking into consideration frequencies with which specific search queries were submitted within a selected time period.

4. The method of claim 1, wherein selecting the plurality of search queries from the query log comprises ignoring search query submissions that produced a null query result.

5. The method of claim 1, wherein the plurality of search queries include search phrases submitted by users.

6. The method of claim 1, wherein incorporating the plurality of search queries into at least one speech recognition grammar comprises applying transformations to specific terms in the search queries.

7. The method of claim 1, wherein incorporating the plurality of search queries into at least one speech recognition grammar comprises generating a master grammar set, and subdividing the master grammar set based on the first N characters of search strings contained therein to generate multiple speech recognition grammars.

8. The method of claim 7, wherein the master grammar set is subdivided such that each speech recognition grammar corresponds to a different respective sequence of N keys of a telephone keypad.

9. The method of claim 7, wherein the master grammar set is subdivided so as to provide fault tolerance against misidentification of an utterance of a first character as being an utterance of a second character that does not appear on a common telephone key as the first character.

10. The method of claim 1, further comprising updating the at least one speech recognition grammar periodically based on an analysis of a most recent set of data contained in the query log.

11. A system that operates according to the method of claim 1.

12. A system that supports voice-based database searches, the system comprising:

a query server system that processes, and maintains a log of, search queries submitted by users over a computer network to search a database;

a grammar generation component that selects search queries from the query log to include within speech recognition grammars based, at least in part, on data regarding how frequently particular search queries are submitted to the query server system without the use of voice; and a speech recognition system that uses the speech recognition grammars generated by the grammar generation component to interpret utterances of search queries by users of the query server system;

whereby the system uses information about search queries submitted without the use of voice to select, for inclusion in the speech recognition grammars, search queries deemed likely to be used to conduct voice-based searches.

13. The system of claim 12, wherein the query server system processes both voice based and non-voice-based search query submissions, and the grammar generation component generates the speech recognition grammars based primarily or entirely on non-voice-based search query submissions contained in the query log.

14. The system of claim 12, wherein the grammar generation component selects search queries from the query log to include within speech recognition grammars based further on post-search actions performed by users.

15. The system of claim 12, wherein the grammar generation component applies transformations to the selected search queries to generate specific entries to include in the speech recognition grammars.

16. The system of claim 12, wherein the grammar generation component substantially ignores search query submissions that produced a null query result.

17. The system of claim 12, wherein the search queries selected by grammar generation component to include within the speech recognition grammars include search phrases submitted by users.

18. The system of claim 12, wherein the grammar generation component generates a master grammar set, and subdivides the master grammar set into multiple speech recognition grammars based on initial sets of characters of each entry in the master grammar set.

19. The system of claim 12, wherein the grammar generation component periodically updates a set of speech recognition grammars to reflect newly acquired query log data.

* * * * *